United States Patent [19]

Isono et al.

[11] 4,316,216

[45] Feb. 16, 1982

[54] BEAM INDEX COLOR TELEVISION RECEIVER

[75] Inventors: Katsuo Isono; Susumu Akazawa, both of Tokyo, Japan

[73] Assignee: Sony Corporation, Tokyo, Japan

[21] Appl. No.: 131,834

[22] Filed: Mar. 19, 1980

[30] Foreign Application Priority Data

Mar. 24, 1979 [JP] Japan ............ 54-34831
Mar. 27, 1979 [JP] Japan ............ 54-35896

[51] Int. Cl.$^3$ ............ H04N 9/24
[52] U.S. Cl. ............ 358/67
[58] Field of Search ............ 358/67, 68, 69, 70

[56] References Cited

U.S. PATENT DOCUMENTS 4,212,030 7/1980 Tooyama ............ 358/67
4,223,344 9/1980 Hosono ............ 358/67

*Primary Examiner*—Michael A. Masinick
*Attorney, Agent, or Firm*—Lewis H. Eslinger

[57] ABSTRACT

In a beam index color television receiver of the type having a cathode ray tube provided with beam-excitable color elements disposed on an image area of a display screen of the cathode ray tube and index elements disposed on the image area and a contiguous run-in area of the display screen, both of the color elements and index elements being scanned by the electron beam as the beam scans the display screen, apparatus for controlling the electron beam includes an index signal generator for generating a periodic index signal as the index elements are scanned by the beam, a phase-locked loop for producing an output signal having a frequency related to the index signal, color gates which sequentially gate respective color control signals individually to modulate the electron beam as the beam scans the color elements, a gating signal circuit which generates sequential gating signals at a frequency synchronized with the frequency of the output signal from the phase-locked loop and which supplies the gating signals in sequence to the color gates to control the latter so as to gate the respective color control signals, and a pulse forming circuit for enabling the phase-locked loop to produce the aforementioned output signal when the electron beam begins scanning the run-in area and for controlling the gating signal circuit to supply the gating signals to the control gates in phase alignment with respect to the scanning of the color elements when the electron beam begins scanning the image area of the display screen.

15 Claims, 54 Drawing Figures

BPF
P·S
P/C
LPF
VCO
1/N
1/3
GATE
S.TRI
FF
COUNTER
CK
CLR
HB
EB
EG
ER
SW
GR
GG
GB
PR
PG
PB
FR
P1
P5
S1
(f1)
S0
(3fH)
31
32
40
41
42
43
44
50
60
70B
70G
70R
70W
71
81
82
83
84
10
13
20

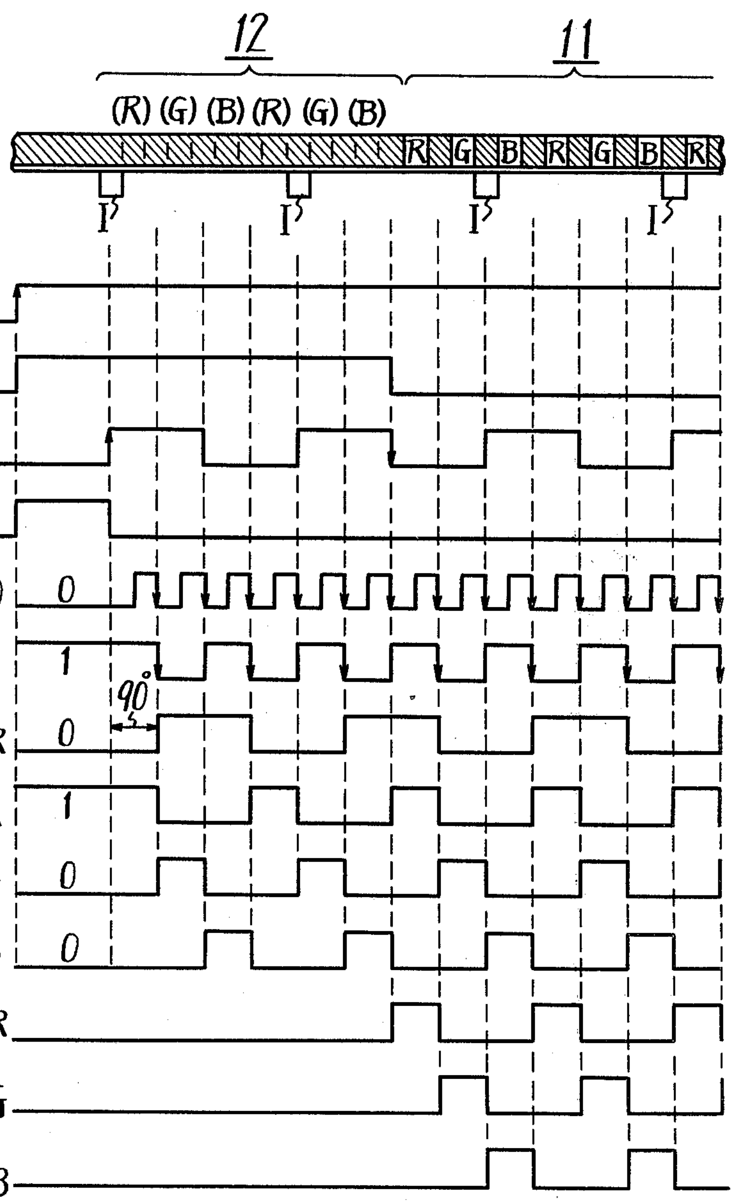
12
11
(R) (G) (B) (R) (G) (B)
R G B R G B R
I
I
I
I
FIG. 3A HB
FIG. 3B SW
FIG. 3C PI(SI)
FIG. 3D PS
FIG. 3E S0
0
FIG. 3F F1
1
90°
FIG. 3G FR
0
FIG. 3H PR
1
FIG. 3I PG
0
FIG. 3J PB
0
FIG. 3K GR
FIG. 3L GG
FIG. 3M GB

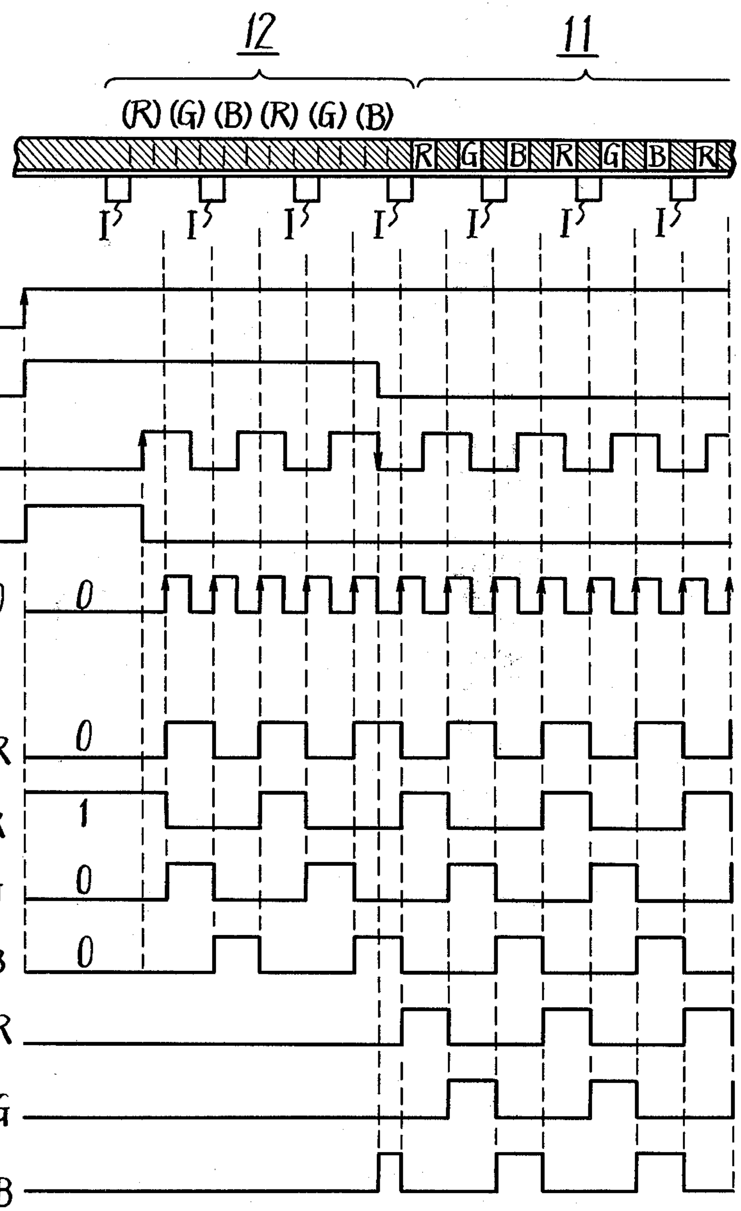
12
11
(R) (G) (B) (R) (G) (B)
R G B R G B R
I I I I I I I
FIG. 4A $H_B$
FIG. 4B $S_W$
FIG. 4C $P_I(S_I)$
FIG. 4D $P_S$
FIG. 4E $S_O$
0
FIG. 4G $F_R$
0
FIG. 4H $P_R$
1
FIG. 4I $P_G$
0
FIG. 4J $P_B$
0
FIG. 4K $G_R$
FIG. 4L $G_G$
FIG. 4M $G_B$ BPF
P.S
P/C
LPF
VCO
1/N
1/3
GATE
S.TRI
FF
R
S
CLR
CK COUNTER
31
32
40
41
42
43
44
50
60
70B
70G
70R
70W
71
81
82
83
84
10
13
20
SI
(fI)
So
(3fr)
FR
PR
PG
PB
GR
GG
GB
EB
EG
ER
PI
PS
SW
HB

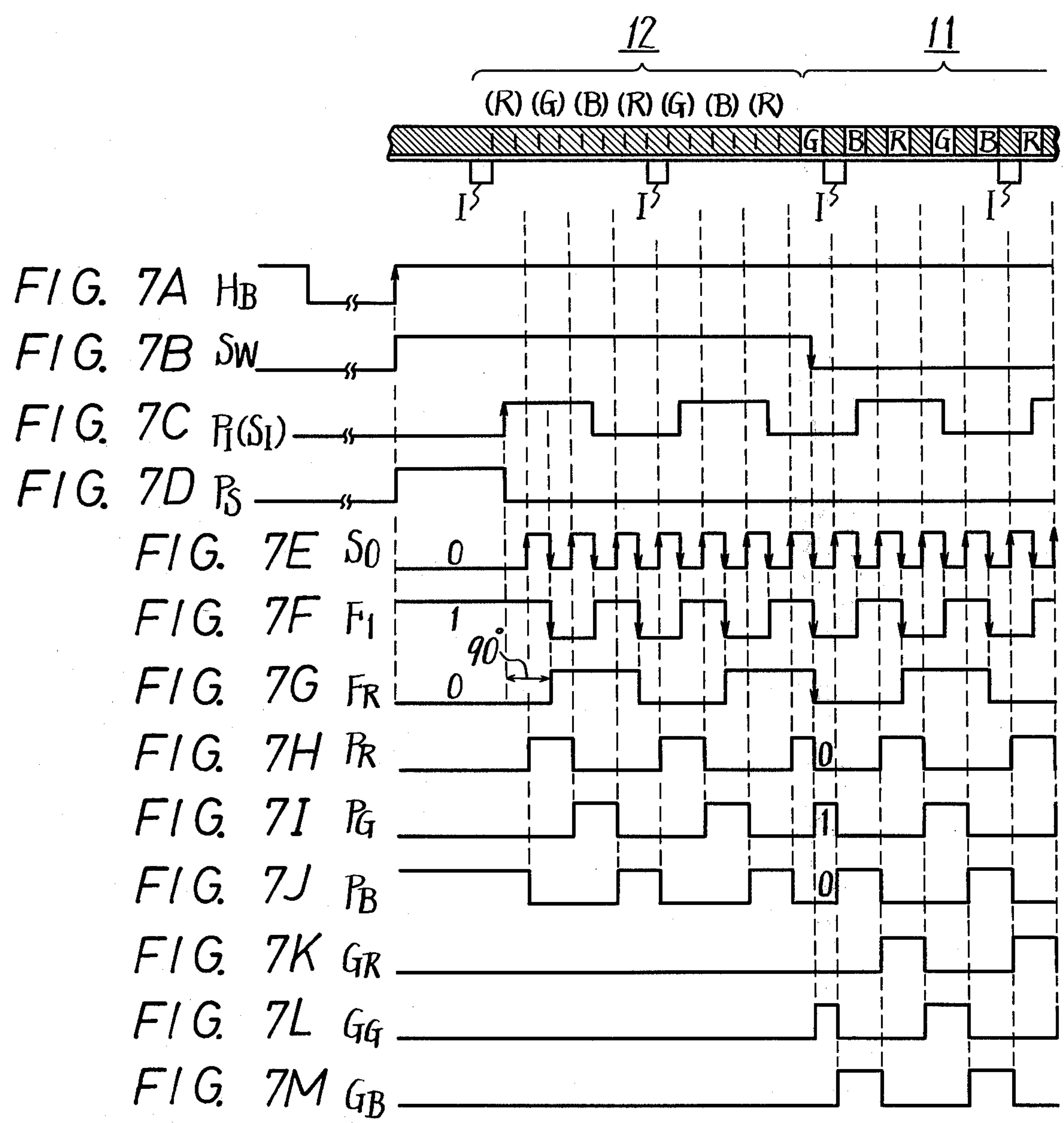
12
11
(R) (G) (B) (R) (G) (B) (R)
G B R G B R
I
I
I
I
FIG. 7A HB
FIG. 7B SW
FIG. 7C PI(SI)
FIG. 7D PS
FIG. 7E S0
0
FIG. 7F F1
1
90°
FIG. 7G FR
0
FIG. 7H PR
0
FIG. 7I PG
1
FIG. 7J PB
0
FIG. 7K GR
FIG. 7L GG
FIG. 7M GB

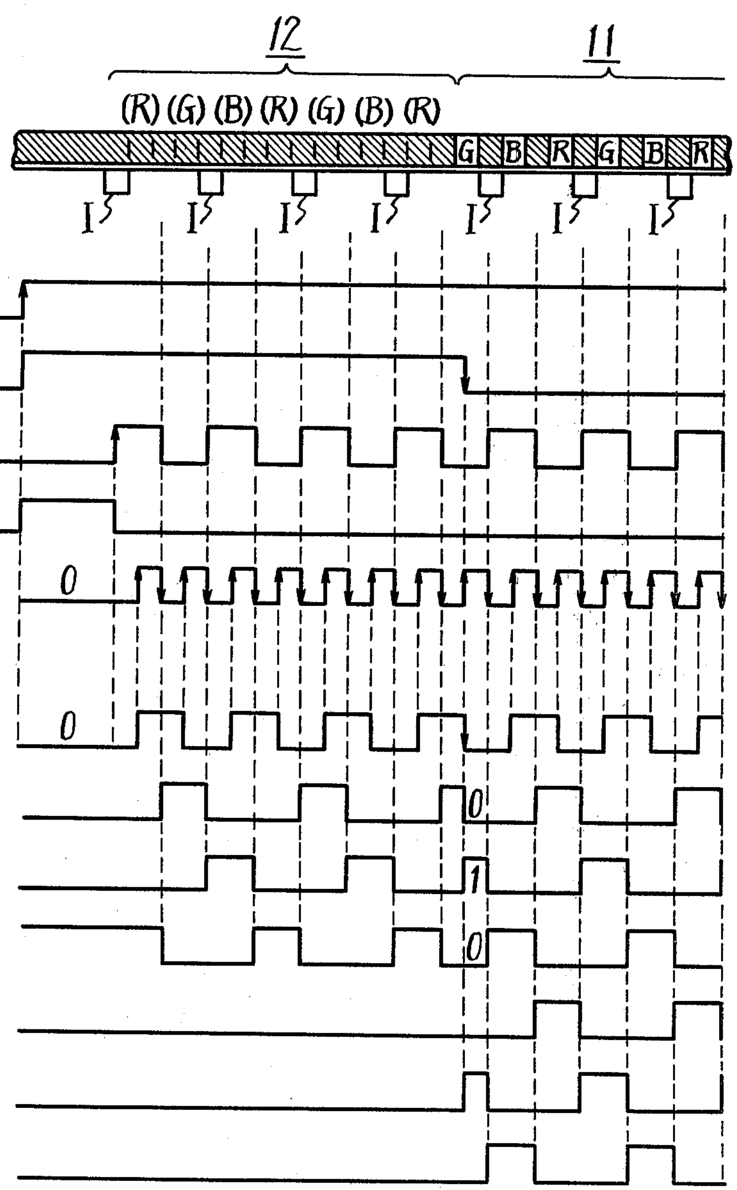
12
11
(R) (G) (B) (R) (G) (B) (R)
G B R G B R
I
FIG. 8A H_B
FIG. 8B SW
FIG. 8C P_I(S_I)
FIG. 8D P_S
FIG. 8E S0
0
FIG. 8G F_R
0
FIG. 8H P_R
0
FIG. 8I P_G
1
FIG. 8J P_B
0
FIG. 8K G_R
FIG. 8L G_G
FIG. 8M G_B

BEAM INDEX COLOR TELEVISION RECEIVER

BACKGROUND OF THE INVENTION

1. Field of the Invention

The present invention relates generally to beam index color television receivers, and, more particularly, is directed to a circuit for controlling the electron beam in a beam index color television receiver.

2. Description of the Prior Art

Beam index color television receivers are known which include a color cathode ray tube having a phosphor screen with red, green and blue color phosphor stripes arranged thereon in the horizontal line scanning direction and with phosphor index stripes arranged on the inner surface thereof also in the horizontal line scanning direction. As is well known, the color the phosphor stipes are arranged in RGB triads repetitively across the screen so as to be scanned by the single electron beam as the latter effects a horizontal line scan in, for example, left-to-right traverse. As the electron beam scans the color phosphor stripes, it also scans the index strips which emit light when excited by the scanning electron beam. A photo-detector responds to each excited phosphor index stripe to produce a signal whose frequency is equal to the frequency at which the phosphor index stripes are excited. Thus, as the electron beam scans a horizontal line across the display screen, the photo-detector generates a periodic index signal. The index signal which is derived from the scanning of the aforementioned phosphor index stripes is used to gate red, green and blue primary color signals onto, for example, the first grid of the cathode ray tube in successive time sequence. In particular, the electron beam is density-modulated with the red primary color signal when the electron beam scans each red phosphor stripe, with the green primary color signal when the beam scans each green phosphor stripe, and with the blue primary color signal when the beam scans each blue phosphor stripe, respectively. In such beam index color television receivers, it is known to arrange the index stripes so that three index stripes are provided for every two sets or triads of red, green and blue color phosphor stripes so that the pitch of the index phosphor stripes is not equal to an integer multiple of the pitch of one set or triad of color phosphor stripes. With such an arrangement, the phase of the index signal is not shifted with the varying excitation of the color phosphor stripes.

However, when the index stripes are so arranged, the gating of the primary color signals to modulate the scanning electron beam in respect to the respective color phosphor stripes becomes difficult. In such a case, the index signal is supplied to, for example, a PLL (phase-locked loop) circuit where it is frequency-multiplied to produce a signal having a frequency three times that of the so-called triplet frequency, the latter being determined by the pitch of one set or triad of color phosphor stripes and the scanning speed of the electron beam. However, when the signal having a frequency three times that of the triplex frequency is supplied to a one-third frequency divider to provide, for example, 3-phase gate signals for gating the respective primary color signals, to the control grid of the cathode ray tube it is necessary to provide a separate control means so that, upon initiation of the horizontal scanning operation, the respective gate signals have their phases aligned or matched to gate the primary color signals when the electron beam is positioned in respect to the corresponding color phosphor stripes.

OBJECTS AND SUMMARY OF THE INVENTION

According, it is an object of the present invention to provide a novel circuit for controlling the electron beam in a beam index color television receiver that avoids the above-described difficulties encountered with the prior art.

More particularly, it is an object of the present invention to provide a circuit for controlling the electron beam in a beam index color television receiver in which phase adjustment of the primary color signals used for modulating the electron beam is carried out in a stable but simple manner. In accordance with an aspect of this invention, apparatus is provided for controlling the electron beam in a beam index color television receiver of the type having a cathode ray tube which is provided with a display screen including an image area and an adjacent contiguous run-in area, the display screen further including beam-excitable color elements disposed along the image area and which are scanned by the electron beam as the latter is modulated by color control signals, and index elements disposed along the image area and run-in area and which are scanned by the electron beam as the latter scans the display screen. The apparatus includes means for generating an index signal in response to the scanning of the index elements, phase-locked loop means supplied with the index signal for producing an output signal having a frequency related to the index signal; gating means for sequentially gating the color control signals individually so as to modulate the electron beam as the beam scans respective ones of the color elements, and gating signal generating means for generating gating pulses in response to the output signal and for supplying the gating pulses to the gating means so as to cause the latter to sequentially gate the respective color control signals. The apparatus further includes means for enabling the phase-locked loop means to produce the output signal when the electron beam begins scanning the run-in area of the display screen and for controlling the gating signal generating means to supply the gating pulses to the gating means in phase alignment with respect to the scanning of the color elements when the electron beam begins scanning the image area, wherein the gating means sequentially gates the respective color control signals in correspondence with the position of the electron beam in respect to the color elements.

The above, and other objects, features and advantages of the present invention will be apparent in the following detailed description of illustrative embodiments of the invention which is to be read in connection with the accompanying drawings.

BRIEF DESCRIPTION OF THE DRAWINGS

FIGS. 3A-3M are waveform diagrams used to explain the operation of the circuit of FIG. 1 in which the pitch of the index stripes is four-thirds that of the pitch of each triad of color phosphor stripes;

FIGS. 4A–4M are waveform diagrams used for explaining the operation of the circuit of FIG. 1 in which the pitch of the index stripes is two-thirds that of the pitch of each triad of color phosphor stripes;

FIGS. 7A–7M are waveform diagrams used to explain the operation of the circuit of FIG. 6 in which the pitch of the index stripes is four-thirds that of the pitch of each triad of color phosphor stripes; and FIGS. 8A–8M are waveform diagrams used for explaining the operation of the circuit of FIG. 6 in which the pitch of the index stripes is two-thirds that of the pitch of each triad of color phosphor stripes.

DESCRIPTION OF THE PREFERRED EMBODIMENTS

Figure 1:
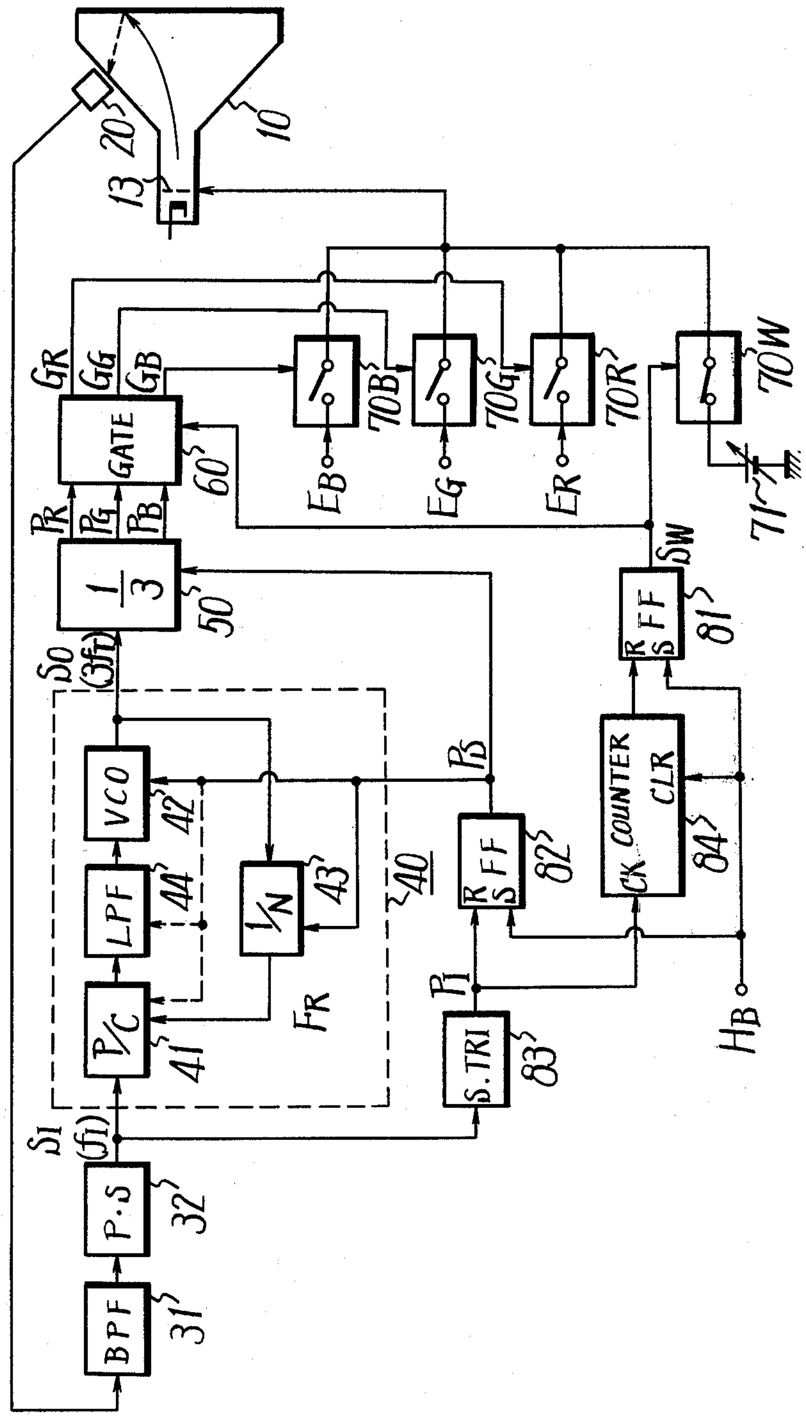
FIG. 1 is a block diagram of a first embodiment of a circuit according to this invention for controlling the electron beam in a beam index color television receiver.

Referring to the drawings in detail, and initially to FIG. 1 thereof, there is shown one embodiment of a circuit for controlling the electron beam in a beam index color television receiver according to the present invention. The beam index color television receiver of FIG. 1 includes a beam index color cathode ray tube 10 having an effective picture screen (FIG. 3) which, for example, is formed with red, green and blue color phosphor stripes R, G along a main or effective picture area 11 and which are shown, for explanation purposes only, along B and a run-in area 12 at the left side of the screen. The screen further includes phosphor index stripes I formed on both areas 11 and 12 with the pitch of index stripes I being selected as four-thirds the pitch of one set or triad of color phosphor stripes R, G and B and with the index stripes I being located between adjacent red, green and blue color phosphor stripes R, G and B. Referring back to FIG. 1, a photo-detector 20 is provided on the outside of the funnel portion of cathode ray tube 10.

The circuit of FIG. 1 includes an RS-flip-flop circuit 81 having a set input terminal S supplied with a horizontal blanking pulse HB (FIG. 3A) which acts to set flip-flop circuit 81 with the rear or positive-going edge of the pulse HB, as indicated by the arrow in FIG. 3A. Flip-flop circuit 81 produces an output signal SW which becomes logic level "1" (FIG. 3B) when flip-flop circuit 81 is set and which is fed to a switch circuit 70W which turns ON, that is, which is closed, during the period when output signal SW is at logic level "1". Thus, at this time, a DC voltage from a variable voltage source 71 which is preliminarily adjusted to a predetermined value is applied through switch circuit 70W to a first grid 13 of cathode ray tube 10. As a result, the electron beam scans run-in area 12 with a relatively large and constant beam current. This results in light being emitted from index stripes I at run-in area 12, such light being detected by photo-detector 20.

The resulting output signal produced by photo-detector 20 is fed through a band pass filter 31 to a phase shifter 32 for phase adjustment therein. Phase shifter 32 produces an index signal SI (FIG. 3C) with a frequency f1 which is determined by the pitch of index stripes I and the scanning speed of the electron beam. This index signal SI is fed to a phase-locked loop (PLL) circuit 40 and, more particularly, to a phase comparator 41 thereof. In PLL circuit 40, a voltage-controlled oscillator 42 is provided which produces an output signal which serves as the output (FIG. 3E) of PLL circuit 40 and which also is fed to a frequency divider 43 where it is frequency-divided by 1/N where N is 4 in the embodiment of FIG. 3. The frequency divided signal (FIG. 3G) from frequency divider 43 is fed to phase comparator 41 and the output voltage of comparator 41 is supplied to voltage-controlled oscillator 42 through a low pass filter 44.

The horizontal blanking pulse HB is also supplied to another RS-flip-flop circuit 82 at its set input terminal S so as to set flip-flop circuit 82 at the rear or positive-going edge of the pulse HB. Flip-flop circuit 82 produces an output signal PS (FIG. 3D) which becomes logic level "1" when flip-flop circuit 82 is set. The index signal SI from phase shifter 32 is also supplied to a Schmitt trigger circuit 83 which, in turn, produces an index pulse PI (FIG. 3C) having the same frequency as index signal SI. This index pulse PI is fed to a reset input terminal R of flip-flop circuit 82 which is reset at the first rising or positive-going edge of index pulse PI whereby output signal PS from flip-flop circuit 82 returns to its logic level "0" state.

The output signal PS from flip-flop circuit 82 is supplied to voltage-controlled oscillator 42 of PLL circuit 40 where it acts to restrict the oscillation phase thereof. In other words, during the logic level "1" state of output signal PS, voltage-controlled oscillator 42 is prevented from oscillating so that its output signal SO (FIG. 3E) is at logic level "0". However, when output signal PS returns to its logic level "0" state at the first rising or positive-going edge of index pulse PI, oscillator 42 resumes its oscillation operation. Thus, during this latter period, output signal SO from oscillator 42 periodically alternates between its logic level "0" and "1" states so that the phase of output signal SO for index pulse PI is determined as shown in FIG. 3E.

The output signal PS from flip-flop circuit 82 is also supplied to frequency divider 43 in PLL circuit 40 for halting the operation of frequency divider 43 simultaneously with the restriction of oscillator 42. More particularly, when the picture screen of color cathode ray tube 10 is constructed as shown in FIG. 3 and frequency divider 43 is a divide-by-4 frequency divider, the latter circuit may be constructed from two flip-flop circuits. In such a case, the first flip-flop circuit is preset during the period when output signal PS is in its logic level "1" state and produces an output signal F1 which is also logic level "1" as shown in FIG. 3F. At the same time, the rear or second flip-flop circuit is cleared and its output signal FR is at logic level "0" as shown in FIG. 3G. When output signal PS has returned to its logic level "0" state, the first flip-flop circuit is triggered at the negative-going edge of output signal SO from oscillator 42 and the rear flip-flop circuit is triggered at the negative-going edge of output signal F1 from the first flip-flop circuit.

As described above, as a result of output signal PS from flip-flop circuit 82 being supplied to VCO 42 and frequency divider 43, the phase of output signal SO from oscillator 42 is determined for a specific index signal SI and also, the state operation of frequency divider 43 is restricted, whereby as shown in FIG. 3G, reference signal FR from frequency divider 43 is delayed from index signal SI (FIG. 3C) by 90°. PLL circuit 40 thus because locked in such phase relationship.

When PLL circuit 40 is locked, output signal SO from oscillator 42 has a frequency 4 times that of index signal SI, that is, 3fT where fT is the triplet frequency. This means that the regative-going edges of output signal SO (FIG. 3E) occur mid-way between adjacent color phosphor stripes R, G and B as the electron beam scans the respective stripes. It is to be realized, however, that color phosphor stripes are not formed on run-in area 12, although for explanation purposes, they are assumed to be extended from the effective picture area 11 to run-in area 12.

The output signal SO from PLL circuit 40 is fed to a one-third frequency divider 50 which produces three gate signals PR, PG and PB (FIGS. 3H, 3I and 3J) in response to output signal SO for gating the red, green and blue primary color signals, respectively. The output signal PS from flip-flop circuit 82 is also fed to frequency divider 50 as a mode set pulse so as to phase align or match gate signals PR, PG and PB.

Figure 2:
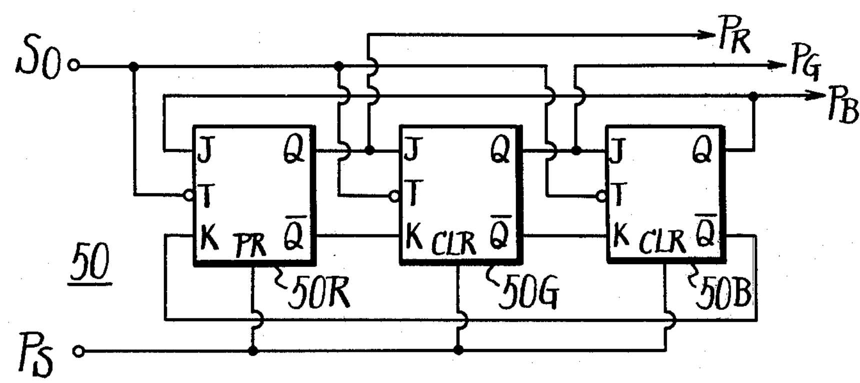
FIG. 2 is a block diagram of one embodiment of the one-third frequency divider used in the circuit of FIG. 1.

As shown in FIG. 2, frequency divider 50 is formed of, for example, a three stage ring counter which comprises three JK-flip-flop circuits 50R, 50G and 50B. The output signal SO from PLL circuit 40 is supplied to each of flip-flop circuits 50R, 50G and 50B at their trigger or clock input terminals T and the output signals of the JK-flip-flop circuits at their respective output terminals Q are used as the gate signals PR, PG and PB for gating the red, green and blue primary color signals, respectively. The output signal PS from flip-flop circuit 82 is fed to flip-flop circuit 50R at its preset input terminal PR and also to flip-flop circuits 50G and 50B at their clear input terminals CLR. Thus, during the logic level "1" stated of output signal PS, flip-flop circuit 50R is preset whereby gate signal PR is at logic level "1", and flip-flop circuits 50G and 50B are cleared whereby both gate signals PG and PB are at logic level "0". When output signal PS return to its logic level "0" state at the first rising or positive-going edge of index pulse PI, the respective outputs from flip-flop circuits 50R, 50G and 50B are thereafter shifted at each negative-going edge of output signal SO so that gate signals PR, PG and PB respectively are at their logic level "1" states when the scanning electron beam is appropriately positioned with respect to the red, green and blue color phosphor stripes R, G and B (which are not provided on run-in area 12 but are assumed to be extended from the effective picture area 11 for explanation purposes only, as previously discussed.

The index pulse PI from Schmitt trigger circuit 83 is also fed to a counter 84 at its clock input terminal CK and the horizontal blanking pulse HB is fed to counter 84 at its clear input terminal CLR. Thus, counter 84 counts the negative-going edges of index pulse PI occurring after the rear or positive-going edge of the pulse HB. For example, when the second negative-going edge of index pulse PI is counted by counter 84 at the end of run-in area 12, counter 84 produces a pulse which is fed to the reset input terminal R of flip-flop circuit 81 to reset circuit 81. The output signal SW from flip-flop circuit 81 therefore becomes logic level "0" and hence, switch circuit 70W is turned OFF or opened.

The three gate signals PR, PG and PB from frequency divider 50 are fed to a gate circuit 60 which is also supplied with output signal SW from flip-flop circuit 81 as the gate signal therefor. Thus, during the logic level "0" state of output signal SW, that is, when the electron beam scans the main picture area 11, gate signals PR, PG and PB are delivered through gate circuit 60 as gate signals GR, GG and GB (FIGS. 3K, 3L and 3M) which, in turn, are fed to switch circuits 70R, 70G and 70B, respectively. Thus, switch circuits 70R, 70G and 70B are turned ON in correspondence positions with the electron beam in relation to the red, green and blue color phosphor stripes R, G and B so as to deliver therethrough the red, green and blue primary color signals ER, EG and EB, respectively. The primary color signals thus switched are then fed to the first grid 13 of color cathode ray tube 10. Referring now to FIG. 4, there is shown another embodiment of a picture screen in which index stripes I are formed over the effective picture area 11 and, for explanation purposes, along run-in area 12 of cathode ray tube 10 with the pitch of index stripes I being selected as two-thirds that of one set or triad of color phosphor stripes R, G and B. In this case, as shown in FIG. 4, during the logic level "1" state of output signal PS (FIG. 4D), which occurs from the rear or positive-going edge of the horizontal blanking pulse HB (FIG. 4A) to the first positive-going edge of index pulse PI (FIG. 4C), voltage-controlled oscillator 42 stops its oscillation phase so that output signal SO is maintained in the logic level "0" state as shown in FIG. 4E. However, when output signal PS returns to its logic level "0" at the first positive-going edge of index pulse PI oscillator 42 resumes its oscillation with the result that its output signal SO periodically alternates between the logic level "0" and "1" states and the phase of output signal SO for index signal is determined as shown in FIG. 4E.

In this embodiment, frequency divider 43 is a divide-by-two frequency divider formed of one flip-flop circuit which is triggered at each positive-going edge of output signal SO from oscillator 42 and cleared during the logic level "1" state of output signal PS, so that the output signal FR from the flip-flop circuit is at logic level "0" at this latter time, as shown in FIG. 4G.

Therefore, as in the case of FIG. 3, output signal FR from frequency divider 43 has its phase delayed by 90° from index signal SI and hence PLL circuit 40 becomes locked in such phase relationship.

When PLL circuit 40 becomes locked, output signal SO from ocsillator 42 is phase-locked to twice the frequency of index signal SI, that is, 3fT where fT is the triplet frequency. This result in the positive-going edges of output signal SO (FIG. 4E) being occurring mid-way between adjacent color phosphor stripes R, G and B as the electron beam scans the respective stripes. As previously stated, color phosphor stripes are not formed on run-in area 12 but are assumed, for explanation purposes, to be extended from effective picture area 11 onto run-in area 12.

Output signal SO from PLL circuit 40 is fed to frequency divider 50 which produces three gate signals PR, PG and PB (FIGS. 4H, 4I and 4J) for gating the red, green and blue primary color signals, respectively. Thus, during the period when output signal PS from flip-flop circuit 82 is at logic level, gate signal PR becomes logic level "1", and gate signals PG and PB both become logic level "0", respectively. The respective outputs from frequency divider 50 are shifted at every positive-going edge of output signal SO, and hence gate signals PR, PG and PB respectively are at logic level "1" when the electron beam is positioned in respect to the red, green and blue color phosphor stripes R, G and B.

Figure 5:
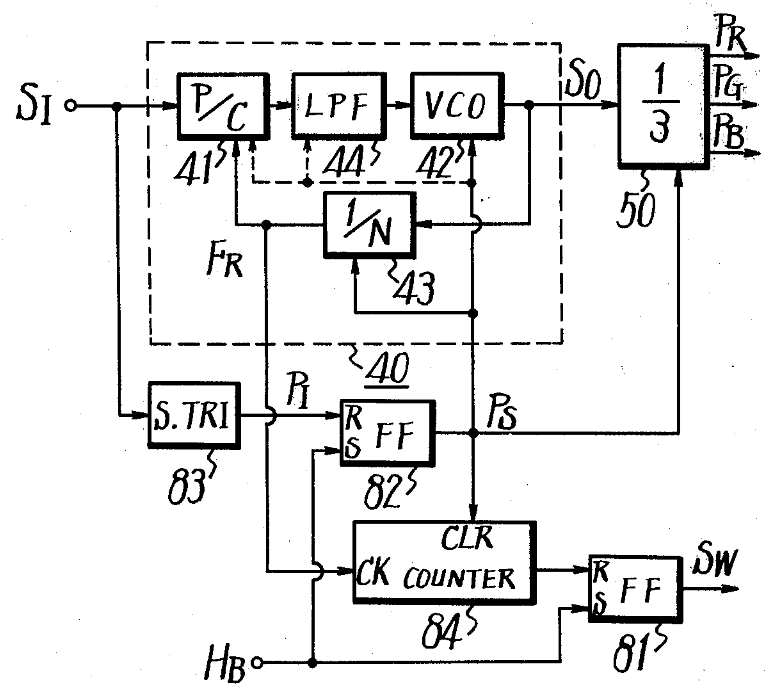
FIG. 5 is a block diagram of another embodiment of a circuit according to this invention for controlling the electron beam in a beam index color television receiver.

Referring now to FIG. 5 there is shown another embodiment of a circuit for controlling the electron beam in a beam index television receiver according to this invention in which elements corresponding to those described above with reference to the circuit of FIG. 1 are identified by the same reference numerals. In this embodiment, instead of index pulse PI from Schmitt trigger circuit 83 being supplied to counter 84, reference signal FR from frequency divider 43 in PLL circuit 40 is supplied to the clock input terminal CK of counter 84, and instead of horizontal blanking pulse HB being supplied to counter 84, output signal PS from flip-flop circuit 82 is supplied to the clear input terminal CLR of counter 84. Thus, after the negative-going edge of output signal PS, either of the positive-going or negative-going edges of reference signal FR are counted by counter 84. The construction and operation of the remainder of the circuit of FIG. 5 are substantially the same as those of the circuit of FIG. 1.

If, as shown in FIGS. 1 and 5 by dotted lines, output signal PS from flip-flop circuit 82 is also supplied to low pass filter 44 or phase comparator 41 to clamp the output DC level from low pass filter 44 or phase comparator 41 to a given value during the logic level "0" period of output signal PS, at the first positive-going edge of index signal SI, PLL circuit 40 is locked more rapidly.

Thus, in accordance with the present invention as described above, the first positive-going edge of index signal SI is detected at the initial point of run-in area 12. Thereafter, output signal PS enables PLL circuit 40 to produce output signal SO which is phase aligned or matched, that is, synchronized, with index signal SI. Also, the color switching signals are phase aligned or matched in correspondence with the position of the electron beam in respect to the color phosphor stripes by means of output signal SW.

Figure 6:
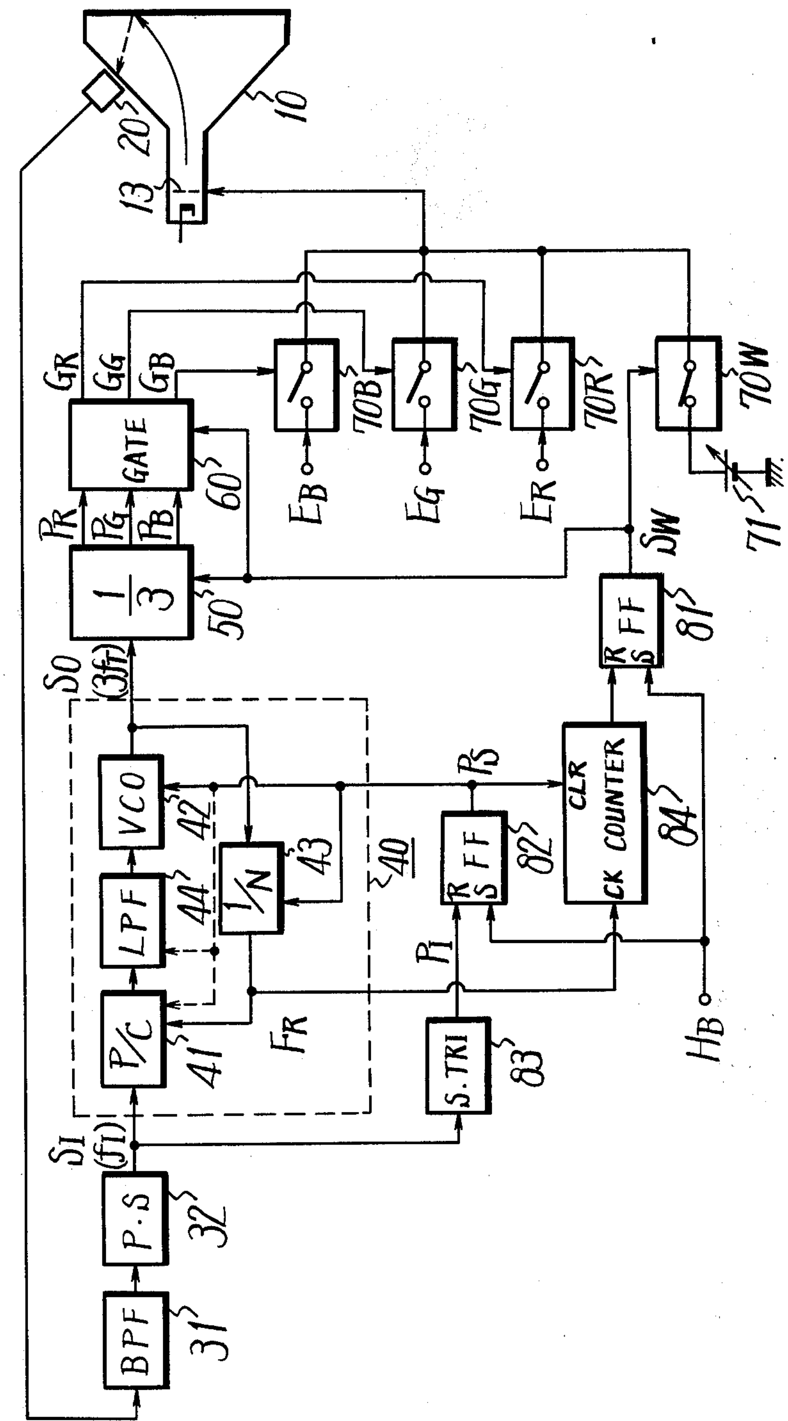
FIG. 6 is a block diagram of a further embodiment of a circuit according to this invention for controlling the electron beam in a beam index color television receiver.

Referring now to FIG. 6 there is shown a further embodiment of a circuit for controlling the electron beam in a beam index color television receiver according to the present invention in which elements corresponding to those described above with reference to the circuit of FIG. 1 are identified by the same reference numerals. In FIG. 6, a beam index color cathode ray tube includes an effective picture screen (FIG. 7) which has a main picture area 11 formed with, for example, red, green and blue color phosphor stripes R, G and B and a run-in area 12 at the left side of main picture area 11. In this embodiment phosphor index stripes I are formed on area 11 and and, for explanation purposes only, on area 12 with the pitch of index stripes I being selected as four-thirds the pitch of one set or triad of color phosphor stripes R, G and B. A photo-detector 20 is also provided on the outside of the funnel portion of cathode ray tube 10.

The circuit of FIG. 6 also includes an RS-flip-flop circuit 81 which is supplied at its set input terminal S with the horizontal blanking pulse HB (FIG. 7A) which acts to set flip-flop circuit 81 with the rear or positive-going edge of the pulse HB, as indicated by the arrow in FIG. 7A. Flip circuit 81 produces an output signal SW which becomes logic level "1" (FIG. 7B) when flip-flop circuit 81 is set and which is fed to the switch circuit 70W which turns ON that is, which is closed, during the period when output signal SW is at logic level "1". Thus, at this time, the DC voltage from variable voltage source 71 which is preliminarily adjusted to a predetermined value value is applied through switch circuit 70W to first grid 13 of cathode ray tube 10. As a result, the electron beam scans run-in area 12 with relatively large and constant beam current. This results in light being emitted from index stripes I at run-in area 12 with such light being detected by photo-detector 20.

The resulting output signal produced by photo-detector 20 is fed through band pass filter 31 to phase shifter 32 for phase adjustment therein. Phase shifter 32 produces index signal SI (FIG. 7C) with a frequency fI which is determined by the pitch of index stripes I and the scanning speed of the electron beam. This index signal SI is fed to PLL circuit 40 and, more particularly, to phase comparator 41 thereof. In PLL circuit 40, a voltage-controlled oscillator 42 is provided which produces an output signal which is fed to frequency divider 43 where it is frequency-divided by 1/N where N is 4 in the embodiment of FIG. 7. The frequency divided signal (FIG. 7G) from frequency divider 43 is fed to phase comparator 41 and the output voltage of comparator 41 is supplied to voltage-controlled oscillator 42 through low pass filter 44.

The horizontal blanking pulse HB is also supplied to another RS-flip-flop circuit 82 at its set input terminal S so as to set flip-flop circuit 82 at the rear or positive-going edge of the pulse HB. Flip-flop circuit 82 produces an output signal PS (FIG. 7D) which becomes logic level "1"when flip-flop circuit 82 is set. The index signal SI from phase shifter 32 is also supplied to a Schmitt trigger circuit 83 which, in turn, produces an index pulse PI (FIG. 7C). This index pulse PI is fed to the reset input terminal R of flip-flop circuit 82 which is reset at the first positive-going edge of index pulse PI whereby output signal PS from flip-flop circuit 82 returns to its logic level "0" state, as shown in FIG. 7D.

The output signal PS from flip-flop circuit 82 is supplied to voltage-controlled oscillator 42 of PLL circuit 40 where it acts to restrict the oscillation phase of oscillator 42. In other words, during the logic level "1" period of output signal PS from the rear or positive-going edge of the horizontal blanking pulse HB to the first positive-going edge of index pulse PI, voltage-controlled oscillator 42 is prevented from oscillating so that its output signal SO (FIG. 7E) is in "0" at logic level. When output signal PS returns to its logic level "0" state at the first rising or positive-going edge of index pulse PI, oscillator 42 resumes its oscillation operation. Thus, during this latter period output signal SO from oscillator 42 periodically alternates between its logic level "0" and "1" states so that the phase of output signal SO for index pulse PI (FIG. 7C) is determined as shown in FIG. 7E.

The output signal PS from flip-flop circuit 82 is also supplied to frequency divider 43 of PLL circuit 40 for halting the operation of frequency divider 43 simultaneously with the restriction of oscillator 42. More particularly, when the picture screen of color cathode ray tube 10 is constructed as shown in FIG. 7 and frequency divider 43 is a divide-by-4 frequency divider, the latter circuit may be constructed from two flip-flop circuits. In such a case, the first flip-flop circuit is triggered at the negative-going edge of output signal SO from oscillator 42 and the rear or second flip-flop circuit is triggered at the negative-going edge of output signal F1 (FIG. 7F) from the first flip-flop circuit. Thus, the first flip-flop circuit is preset to logic level "1" (FIG. 7F) during the period when output signal PS is at logic level "1". At the same time, the second flip-flop circuit is cleared and its output signal FR is made at logic level "0", as shown in FIG. 7G.

As described above, as a result of output signal PS from flip-flop circuit 82 being supplied to VCO 42 and frequency divider 43, the phase of output signal SO from oscillator 42 in PLL circuit 40 is determined for a specific index signal SI and also, the operation of frequency divider 43 is restricted, whereby as shown in FIG. 7G, reference signal FR from frequency divider 43 is delayed from index signal SI (FIG. 7C) by 90°. At the first rising-up edge of the index pulse PI, PLL circuit 40 thus becomes locked in such phase relationship.

When PLL circuit 40 is locked, output signal SO from oscillator 42 has a frequency 4 times that of index signal SI, that is, where fT is the triplet frequency. This means that the negative-going edges of output signal SO occur mid-way between adjacent color phosphor stripes R, G and B as the electron beam scans the respective stripes. It is to be realized, however, that color phosphor stripes are not formed on run-in area 12, although for explanation purposes, they are assumed to be extended from the effective picture area 11 to run-in area 12.

The reference signal FR from frequency divider 43 in PLL circuit 40 is fed to counter 84 at its clock input terminal CK and output signal PS from flip-flop circuit 82 is fed to counter 84 at its clear input terminal CLR. Thus, the first negative-going edge of reference signal FR after the negative-going edge of output signal PS (that is, after the first positive-going edge of index pulse PI) initiates the counting operation by counter 84. For example, when the second negative-going edge of reference signal FR is counted by counter 84 at the end of run-in area 12, counter 84 produces a pulse which is fed to the reset input terminal R of flip-flop circuit 81 to reset circuit 81. Thus, output signal SW from flip-flop circuit 81 returns to its logic level "0" state and switch circuit 70W is turned OFF or opened.

The output signal SO from PLL circuit 40 is fed to one-third frequency divider 50 which produces three gate signals PR, PG and PB (FIGS. 7H, 7I and 7J) for gating the red, green and blue primary color signals, respectively. Output signal SW from flip-flop circuit 81 is supplied to frequency divider 50 as a mode set pulse so as to phase align or match gate signals PR, PG and PB at their negative-going edges.

As previously described in regard to FIG. 2, frequency divider 50 is formed, for example, of a ring counter including three JK-flip-flop circuits. The output signal SO from PLL circuit 40 is supplied to the trigger or clock input terminal of each of the JK-flip-flop circuits, and the outputs from the JK-flip-flop circuits at the Q terminals thereof are shifted at every positive-going edge of output signal SO and are used as the gate signals PR, PG and PB for gating the red, green and blue primary color signals, respectively. Thus, as shown in FIGS. 7B and 7H to 7J, at the negative-going edge of output signal SW from flip-flop circuit 81, the first JK-flip-flop circuit is cleared with its gate signal PR having a value equal to logic level "0", the second JK-flip-flop circuit is preset with its gate signal PG having a value equal to logic level "1", and the third JK-flip-flop circuit is cleared with its gate signal PB having a value equal to logic level "0".

Thus, the phase of output signal SO from PLL circuit 40 results in the positive-going edges of output signal SO occurring mid-way between adjacent color phosphor stripes R, G and B electron beam scans the respective stripes. Also, the negative-going edge of output signal SW coincides with the second negative-going edge of reference signal FR from frequency divider 43 when the electron beam is positioned at a predetermined color phosphor stripe, for example, green color phosphor stripe G, as shown in FIG. 7. Therefore, during the logic level period "0" state of output signal SW, that is, at main picture area 11, gate signals PR, PG and PB respectively have a logic level "1" value at respective positions of the electron beam in respect to red, green and blue color phosphor stripes R, G, and B.

Gate signals PR, PG and PB from frequency divider 50 are fed to gate circuit 60 which is also supplied with output signal SW from flip-flop circuit 81 as the gate signal therefor. Thus, during the logic level "0" state of output signal SW, that is, when the electron beam scans the main picture area 11, gate signals PR, PG and PB are delivered through gate circuit 60 as gate signals GR, GG and GB (FIGS. 7K, 7L and 7M) which, in turn, are fed to switch circuits 70R, 70G and 70B, respectively. Thus, switch circuits 70R, 70G and 70B are turned ON in correspondence with positions of the electron beam in relation to the red, green and blue color phosphor stripes R, G and B so as to deliver therethrough the red, green and blue primary color signals ER, EG and EB, respectively. The primary color signals thus switched are then fed to the first grid 13 of color cathode ray tube 10.

Referring now to FIG. 8 there is shown a yet further embodiment of a picture screen in which index stripes I are formed over the effective picture area 11 and, for explanation purposes, along run-in area 12 of the picture screen of cathode ray tube 10 with the pitch of index stripes I being selected at two-thirds that of one set or triad of color phosphor stripes R, G and B. In this case, as shown in FIG. 8, during the logic level "1" state of output signal PS (FIG. 8D), which occurs from the rear or positive-going edge of the horizontal blanking pulse HB (FIG. 8A) to the first positive-going edge of the index pulse PI (FIG. 4C), voltage-controlled oscillator 42 stops its oscillation phase so that output signal SO is maintained in the logic level "0" state. However, when output signal PS returns to its logic level "0" state at the first positive-going edge of index pulse PI, oscillator 42 resumes its oscillation state with the result that its output signal SO periodically alternates between the logic level "0" and "1" states and the phase of output signal SO for index pulse PI is determined as shown in FIG. 8E.

In this embodiment, frequency divider 43 is a divide-by-two frequency divider formed of one flip-flop circuit which is triggered at each positive-going edge of output signal SO from oscillator 42 and cleared during the logic level "1" period of output signal PS so that output signal FR from flip-flop circuit is at logic level "0" at this latter time.

Therefore, as in the case of FIG. 7, output signal FR from frequency divider 43 has its phase delayed by 90° from index signal SI and hence, PLL circuit 40 becomes locked in such phase relationship.

When PLL circuit 40 becomes locked, output signal SO from oscillator 42 is phase locked to twice the frequency of index signal SI, that is, 3fT where fT is the triplet frequency. This results in the negative-going edges of output signal SO occurring mid-way between adjacent color phosphor stripes R, G and B as the electron beam scans the respective stripes. As previously stated, color phosphor stripes are not formed on run-in area 12, although they are assumed to be extended from main picture area 11 for explanation purposes, as shown in FIG. 8.

Output signal SO from PLL circuit 40 is supplied to frequency divider 50 from which the gate signals PR, PG and PB are produced. In this embodiment, at the negative-going edge of output signal SW from flip-flop circuit 81, gate signal PR is at logic level "0", gate signal PG is at logic level "1", and gate signal PB is at logic level "0", respectively, as shown in FIGS. 8H to 8J. However, in this embodiment, the respective outputs are shifted at every negative-going edge of output signal SO, so that during the logic level "0" period of output signal SW, that is, when the electron beam scans main picture area 11, the respective gate signals PR, PG and PB alternately are at logic level "1" when the electron beam is positioned in respect to the red, green and blue phosphor stripes R, G and B.

Thus, in accordance with the present invention as described above, the first positive-going edge of the index signal is detected at the intial point of run-in area 12 of cathode ray tube 10. Thereafter, output signal PS enables PLL circuit 40 to produce output signal SO which is synchronized with index signal SI. Also, one of frequency-divided signal FR and index pulse PI is counted in counter 84 which acts to reset flip-flop circuit 81 so as to achieve phase alignment or matching of the color switching signals for the respective color phosphor stripes. In this manner, synchronization of the color switching signals can stably and positively be obtained by using either the positive-going or negative-going edges of output signal SO from PLL circuit 40 without complicated timing adjustment circuitry as in the prior art.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. Apparatus for controlling the electron beam in a beam index color television receiver of the type having a cathode ray tube which is provided with a display screen including an image area and an adjacent contiguous run-in area and including beam-excitable color elements disposed along said image area, which are scanned by said electron beam as the latter is modulated by color control signals and index elements disposed along said image area and run-in area, which are scanned by said electron beam as the latter scans said display screen, said apparatus comprising:

means for generating an index signal in response to the scanning of said index elements;

phase-locked loop means supplied with said index signal for producing an output signal having a frequency related to said index signal;

gating means for sequentially gating said color control signals individually so as to modulate said electron beam as said beam scans respective ones of said color elements;

means for generating gating pulses in response to said output signal and for supplying said gating pulses to said gating means so as to cause the latter to sequentially gate said respective color control signals; and means apart from said means for generating an index signal for enabling said phase-locked loop means to operate so that the latter means produces said output signal having a frequency related to said index signal when said electron beam begins scanning said run-in area and for controlling said means for generating gating pulses to supply said gating pulses to said gating means in phase alignment with respect to the scanning of said color elements when said electron beam begins scanning said image area, so that said gating means sequentially gates said respective color control signals in correspondence with the position of said electron beam in respect to said color elements.

2. Apparatus for controlling the electron beam in a beam index color television receiver of the type having a cathode ray tube which is provided with a display screen including an image area and an adjacent contiguous run-in area and including beam-excitable color elements disposed along said image area, which are scanned by said electron beam as the latter is modulated by color control signals and index elements disposed along said image area and run-in area, which are scanned by said electron beam as the latter scans said display screen, said apparatus comprising:

means for generating an index signal in response to the scanning of said index elements;

phase-locked loop means supplied with said index signal for producing an output signal having a frequency related to said index signal;

gating means for sequentially gating said color control signals individually so as to modulate said electron beam as said beam scans respective ones of said color elements;

means for generating gating pulses in response to said output signal and for supplying said gating phases to said gating means so as to cause the latter to sequentially gate said respective color control signals; and means for enabling said phase-locked loop means to produce said output signal when said electron beam begins scanning said run-in area and for controlling said means for generating gating pulses to supply said gating pulses to said gating means in phase alignment with respect to the scanning of said color elements when said electron beam begins scanning said image area, so that said gating means sequentially gates said respective color control signals in correspondence with the position of said electron beam in respect to said color elements, in which said beam index color television receiver receives a horizontal blanking signal, and said means for enabling said phase-locked loop means includes first flip-flop means for producing a pulse signal in response to said index signal and said horizontal blanking signal so as to enable said phase-locked loop means to produce said output signal when said electron beam begins scanning said run-in area.

3. Apparatus according to claim 2; in which said phase-locked loop means includes oscillator means, and said pulse signal from said first flip-flop means is supplied to said oscillator means for enabling said oscillator means to produce said output signal when said electron beam begins scanning said run-in area.

4. Apparatus according to claim 3; in which said phase-locked loop means further includes frequency-divider means, phase comparator means and filter means, and said pulse signal from said first flip-flop means is supplied to at least one of said frequency-divider means, phase comparator means and filter means for rendering operative said at least one of said frequency-divider means, phase comparator means and filter means when said electron beam begins scanning said run-in area.

5. Apparatus according to claim 2; in which said first flip-flop means includes a set input terminal and a reset input terminal, and said means for enabling said phase-locked loop means further includes Schmitt trigger means for supplying a reset signal to said reset input terminal in response to said index signal; and in which said horizontal blanking signal is supplied to said set input terminal for setting said flip-flop means.

6. Apparatus according to claim 2; in which said pulse signal from said first flip-flop means is supplied to said means for generating so as to control said means for generating to supply said gating pulses to said gating means in phase alignment with respect to the scanning of said color elements.

7. Apparatus according to claim 2; in which said means for enabling and controlling includes second flip-flop means for supplying a second pulse signal to said means for generating in response to said index signal and said horizontal blanking signal so as to control said means for generating to supply said gating pulses to said gating means in phase alignment with respect to the scanning of said color elements.

8. Apparatus according to claim 7; in which said second flip-flop means includes a set input terminal and a reset input terminal and said means for enabling and controlling further includes delay means for supplying a reset signal to said reset input terminal at a predetermined time after generation of said index signal.

9. Apparatus according to claim 8; in which said set input terminal is supplied with said horizontal blanking signal, and said delay means includes counter means having a clear input terminal supplied with said pulse signal from said first flip-flop means and a clock input terminal supplied with a signal corresponding to said index signal.

10. Apparatus according to claim 7; further comprising a voltage source for producing a voltage of a predetermined value, and switch means for supplying said voltage to said cathode ray tube when said electron beam scans said run-in area.

11. Apparatus according to claim 10; in which said second pulse signal is supplied to said switch means to interrupt the supply of voltage to said cathode ray tube and to said gating means for enabling said gating means to sequentially gate said color control signals individually as said electron beam begins scanning said image area.

12. Apparatus according to claim 2; further comprising a voltage source for supplying a voltage of a predetermined value to said cathode ray tube when said electron beam scans said run-in area, and means for interrupting the supply of said voltage to said cathode ray tube and for enabling said gating means to sequently gate said color control signals individually when said electron beam begins scanning said image area.

13. Apparatus according to claim 12; in which said means for interrupting and enabling includes switch means connected between said voltage source and said cathode ray tube, and second flip-flop means for actuating said switch means to interrupt the supply of voltage to said cathode ray tube and for enabling said gate means to sequently gate said color control signals individually when said electron beam begins scanning said image area.

14. Apparatus according to claim 13; in which said second flip-flop means includes a reset input terminal and a set input terminal supplied with said horizontal blanking signal, and said means for interrupting and enabling further includes delay means for supplying a reset signal to said reset input terminal at a predetermined time after receipt of said horizontal blanking signal.

15. Apparatus for controlling the electron beam in a beam index color television receiver of the type having a cathode ray tube which is provided with a display screen including an image area and an adjacent contiguous run-in area and including beam-excitable color elements disposed along said image area, which are scanned by said electron beam as the latter is modulated by color control signals and index elements disposed along said image area and run-in area, which are scanned by said electron beam as the latter scans said display screen, said apparatus comprising:

means for generating an index signal in response to the scanning of said index elements;

phase-locked loop means supplied with said index signal for producing an output signal having a frequency related to said index signal;

gating means for sequentially gating said color control signals individually so as to modulate said electron beam as said beam scans respective ones of said color elements;

means for generating gating pulses in response to said output signal and for supplying said gating pulses to said gating means so as to cause the latter to sequentially gate said respective color control signals; and means for enabling said phase-locked loop means to produce said output signal when said electron beam begins scanning said run-in area and for controlling said means for generating gating pulses to supply said gating pulses to said gating means in phase alignment with respect to the scanning of said color elements when said electron beam begins scanning said image area, so that said gating means sequentially gates said respective color control signals in correspondence with the position of said electron beam in respect to said color elements;

and in which said means for generating gating pulses includes ring counter means having three flip-flop means, each of said flip-flop means having a clock input terminal supplied with said output signal and a preset input terminal controlled by said means for enabling and controlling for presetting each of said flip-flop means so as to supply said gating pulses to said gating means in correspondence with the position of the electron beam in respect to said color elements.

* * * * *